United States Patent
Groll

(10) Patent No.: US 9,060,639 B2
(45) Date of Patent: Jun. 23, 2015

(54) MULTI-PLY ALUMINUM BONDED COOKWARE

(75) Inventor: William A. Groll, McMurray, PA (US)

(73) Assignee: All-Clad Metalcrafters LLC, Canonsburg, PA (US)

( * ) Notice: Subject to any disclaimer, the term of this patent is extended or adjusted under 35 U.S.C. 154(b) by 350 days.

(21) Appl. No.: 13/479,450

(22) Filed: May 24, 2012

(65) Prior Publication Data

US 2013/0017410 A1 Jan. 17, 2013

Related U.S. Application Data

(60) Provisional application No. 61/507,167, filed on Jul. 13, 2011.

(51) Int. Cl.
| | |
|---|---|
| *B32B 15/00* | (2006.01) |
| *A47J 36/02* | (2006.01) |
| *B32B 15/01* | (2006.01) |
| *C23C 28/02* | (2006.01) |
| *C23C 28/00* | (2006.01) |
| *C23C 30/00* | (2006.01) |

(52) U.S. Cl.
CPC .......... *A47J 36/02* (2013.01); *Y10T 428/12764* (2015.01); *B32B 15/016* (2013.01); *C23C 28/021* (2013.01); *C23C 28/023* (2013.01); *C23C 28/32* (2013.01); *C23C 28/321* (2013.01); *C23C 28/322* (2013.01); *C23C 28/345* (2013.01); *C23C 30/00* (2013.01)

(58) Field of Classification Search
None
See application file for complete search history.

(56) References Cited

U.S. PATENT DOCUMENTS

| | | | |
|---|---|---|---|
| 2,269,627 | A | 1/1942 | Hellberg |
| 3,773,477 | A | 11/1973 | McGinnis et al. |
| 3,825,993 | A | 7/1974 | McGinnis et al. |
| 3,927,243 | A | 12/1975 | Theisen |
| 4,004,892 | A | 1/1977 | Ulam |
| 4,167,606 | A | 9/1979 | Ulam |
| 4,246,045 | A | 1/1981 | Ulam |
| 4,646,935 | A | 3/1987 | Ulam |
| 5,952,112 | A | 9/1999 | Spring |
| 6,267,830 | B1 | 7/2001 | Groll |
| 6,360,423 | B1 | 3/2002 | Groll |
| 6,544,669 | B2 | 4/2003 | Groll |
| 6,926,971 | B2 | 8/2005 | Groll |
| 7,168,148 | B2 | 1/2007 | Groll |
| 7,320,277 | B2 | 1/2008 | Vanthoor |
| 7,353,981 | B2 | 4/2008 | Groll |
| 7,378,623 | B2 | 5/2008 | Tarenga |
| 7,387,844 | B2 | 6/2008 | Ueda et al. |
| 7,960,034 | B2 | 6/2011 | Groll |
| 2002/0034653 | A1 | 3/2002 | Okamoto et al. |
| 2004/0229079 | A1 | 11/2004 | Groll |
| 2005/0161458 | A1 | 7/2005 | Cheng et al. |

(Continued)

*Primary Examiner* — Mark Ruthkosky
*Assistant Examiner* — Daniel J Schleis
(74) *Attorney, Agent, or Firm* — The Webb Law Firm

(57) ABSTRACT

Cookware, such as a stock pot, fry pan, sauté pan, griddle, or grill, comprising a basic three-ply bonded composite includes two layers of an aluminum alloy, such as 3003 or the like, bonded on opposed sides to a core layer of higher purity aluminum, such as 1050, 1100, 1145, or the like, to define a three-ply composite cookware product. One or more additional layers of higher purity aluminum are bonded intermediate one or more additional layers of aluminum alloy to form five-ply, or seven-ply, or more, bonded composite cookware products. The exterior layers of aluminum alloy may also include a non-stick coating and/or an anodized coating.

20 Claims, 1 Drawing Sheet

(56) References Cited

U.S. PATENT DOCUMENTS

| | | |
|---|---|---|
| 2006/0283865 A1 | 12/2006 | Cheng |
| 2007/0275263 A1 * | 11/2007 | Groll .......................... 428/653 |
| 2008/0142526 A1 | 6/2008 | Cheng et al. |
| 2010/0266871 A1 | 10/2010 | Matsuo et al. |
| 2011/0056956 A1 | 3/2011 | Cheng |

* cited by examiner

MULTI-PLY ALUMINUM BONDED COOKWARE

CROSS-REFERENCE TO RELATED APPLICATION

This application claims priority to U.S. Provisional Application No. 61/507,167 filed Jul. 13, 2011, which is incorporated herein in its entirety.

BACKGROUND OF THE INVENTION

1. Field of the Invention

The present invention relates to multi-ply bonded metal composites of aluminum cookware articles such as pots and pans and methods for making them.

2. Description of the Related Art

Cookware, such as pots and pans, has been manufactured from aluminum alloy for a considerable time. Aluminum alloy has been a popular metal for the construction of cookware because of its physical properties. Aluminum alloy has a high degree of thermal conductivity, is relatively strong, formable, and is suitable for the application of numerous decorative and functional coatings. The conventional aluminum cookware is usually made from a single layer of aluminum alloy which may be anodized on the outside surface and given a non-stick surface on the inside, cooking surface. Oftentimes such cookware is made from 3003 aluminum alloy or a like aluminum alloy which offers higher strength than purer aluminum such as 1100 aluminum.

It is also well known to manufacture cookware, such as pots and pans, made from composite bonded metal layers of stainless steel with an aluminum core layer or with a copper core layer to improve the thermal conductivity of the composite, as evidenced by U.S. Pat. No. 4,004,892 to Ulam and U.S. Pat. No. 6,267,830 to Groll. It is also known to provide a composite bonded metal construction with a core layer of stainless steel or titanium to provide a heat diffusion layer or "heat dam" to provide a more even heating distribution to the cooking surface as evidenced by U.S. Pat. No. 6,926,971 to Groll.

It is also known to use an "Alclad" layer or layers of pre-bonded aluminum layers in the manufacture of cookware. The Alclad product may consist of a three-layer composite of inner and outer layers of a relatively pure layer of aluminum such as 1100, 1130, 1145 aluminum bonded to a core layer of a stronger aluminum alloy such as 3003, 3004, or 5005 aluminum alloy. The purer aluminum layers offer superior bonding properties for bonding to other dissimilar metal layers such as stainless steel or copper, for example, as disclosed in U.S. Pat. No. 4,246,045 to Ulam. It is also known that Alclad pre-bonded material is produced as a two-layer product consisting of a relatively pure aluminum layer of the 1XXX series, roll-bonded to an aluminum alloy of 3003 or 3004 aluminum alloy for use in cookware, where the aluminum alloy forms the outer layer of the cookware and the pure aluminum is bonded to a layer of stainless steel or copper, for example.

SUMMARY OF THE INVENTION

Briefly stated, the present invention, in its basic form, is a lightweight, three-layer bonded composite comprising two layers of a higher strength aluminum alloy, such as 3003 (or similar aluminum alloy), bonded to two sides of a central core layer of a higher purity aluminum of the 1XXX series, such as 1050, 1100, 1145 or the like to make a three-layer bonded aluminum composite which is then formed, as by drawing, hydroforming, or spinning, or the like, into a desired shape for cookware, such as a pot or pan. The aluminum alloy outer layers are well suited for strength and formability, as well as suitable for the application of surface treatments, such as non-stick coating or anodizing. The central core layer of higher purity aluminum has a higher coefficient of thermal conductivity than the outer aluminum alloy layers to provide improved uniform heating characteristics for the cookware by minimizing hot spots on the cooking surface, strength and light weight. The present invention further contemplates the use of additional combinations of the above-described three-layer bonded composite in the manufacture of five-layer or seven-layer all aluminum cookware products, for example. These, as well as other attributes and advantages of the present invention, will become more apparent when reference is made to the following drawings when taken with the detailed description thereafter.

DETAILED DESCRIPTION OF THE INVENTION

Figure 1:
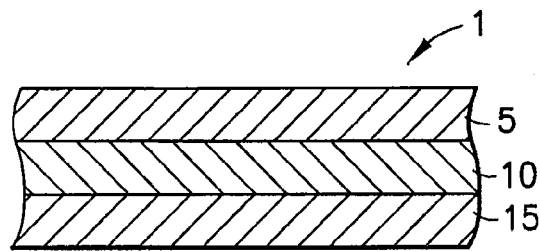
FIG. 1 is a partial cross-sectional view of a three-layer bonded composite of the present invention.
Figure 2:
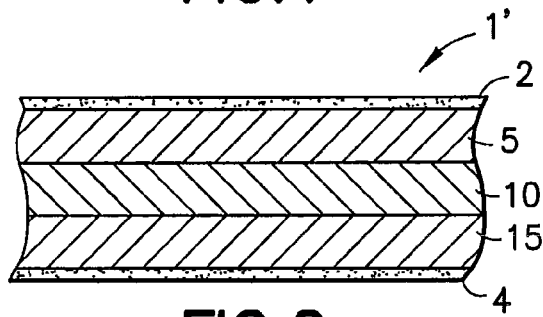
FIG. 2 is a partial cross-sectional view of the bonded composite of FIG. 1 showing surface coatings applied thereto.

With reference now to the drawings, FIG. 1 depicts a basic three-layer bonded composite 1 of the present invention comprising first and second outer layers 5 and 15 of a higher strength aluminum alloy such as 3003 or 3004 aluminum alloy (or similar alloy) bonded on two sides of a central core layer 10 of a higher purity aluminum, such as 1050, 1100, 1145, or the like containing at least 99 wt % Al. The aluminum alloy layers 5 and 15 on the exterior are well suited for strength, formability, and application of surface treatments such as the application of a non-stick coating 2 and/or hard anodized coating 4 as shown in FIG. 2 and representing bonded composite 1. The three-layer composite 1 is formed by drawing or hydroforming, for example, in a well-known process into a desired cookware shape such as a pot, pan, griddle, grill plate, or the like. The coatings 2 and/or 4 may be applied after the shape-forming operation, also in a well-known manner. The non-stick coating 2 may be a conventional type coating. Alternatively, the entire exterior of the formed cookware shape may be first covered with the anodized coating 4 and then the non-stick coating 2 may be applied to the cook surface on top of the anodized coating 4 on the cook surface, if desired (not shown). This may be desired since, in the event the non-stick surface 2 is scratched, the underlying anodized coating 4 still protects the aluminum layer 5.

The use of the higher purity aluminum core 10 provides higher thermal conductivity in the core of the composite so as to improve the performance of the cookware by yielding more uniform heat distribution at the cooking surface. This uniform heating feature prevents hot spots from developing on the cooking surface to permit more even cooking and to provide a longer life for the non-stick coating 2. A non-stick coating will tend to thermally degrade more rapidly in the area of high temperature hot spots. Hence, the life of the non-stick coating 2 is enhanced in the present invention as well as cooking performance. Uniform temperature across the cooking surface also reduces the probability of burning food and makes clean-up easier.

The aluminum alloy layers 5, 15, and core 10 of higher purity aluminum are bonded by any of the well-known commercial methods such as roll-bonding, for example. The relative thickness ratios of the outer layer 5/core layer 10/outer layer 15 may vary from about 10%/80%/10% (100% total thickness) to about 45%/10%/45%. A presently-preferred thickness ratio is about 16%/68%/16%. The thickness ratios of the outer layers 5 and 15 may also be an asymmetric arrangement, such as, for example, 20%/70%/10%. Also, the two aluminum alloy layers 5 and 15 do not need to be comprised of the same alloy. For example, one of the aluminum alloy layers could be 3003 aluminum alloy while the other could be 3002 or 3004 aluminum alloy or the like. A typical overall thickness for the composite layers 5, 15, and 10 is on the order of about 0.130" to about 0.180". Preferably, the overall thickness is about 0.160".

As mentioned previously, the aluminum alloy layers 5 and 15 are well suited for strength, formability, and for the application of surface treatments. The small amounts of alloy additions, such as iron, copper, manganese, magnesium, or silicon, to mention a few, which bring about these desirable characteristics, also give the outer layers 5 and 15 a lower coefficient of thermal conductivity than a higher purity aluminum, such as in core layer 10. Higher purity core layer 10 is, by its nature, not as strong as an aluminum alloy or as suitable for forming or coating as the alloyed exterior layers 5 and 15 but, as mentioned, it has a desirable higher coefficient of thermal conductivity which makes it suitable for use as the core layer 10 in the bonded composite. By way of example, the coefficient of thermal conductivity of 3003 aluminum alloy is 162 W/m-K at 25° C., while the coefficient of thermal conductivity of higher purity 1145 aluminum is 227 W/m-K at 25° C. Hence, the higher purity aluminum has a coefficient of thermal conductivity about 40% greater than the aluminum alloy which makes it ideally suited for a core material in the composite cookware.

In order to further enhance the cooking characteristics and physical properties, such as strength, weight, durability, and thermal properties of the cookware, additional layers of aluminum alloy and higher purity aluminum may be bonded to the basic three-ply composite 1 shown in FIG. 1.

Figure 3:
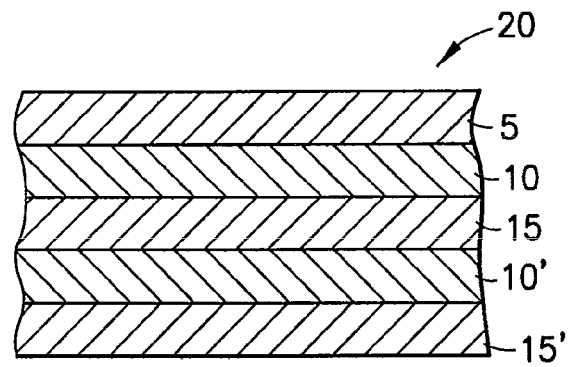
FIG. 3 is a partial cross-sectional view of another embodiment of the present invention showing a five-layer bonded composite.
Figure 4:
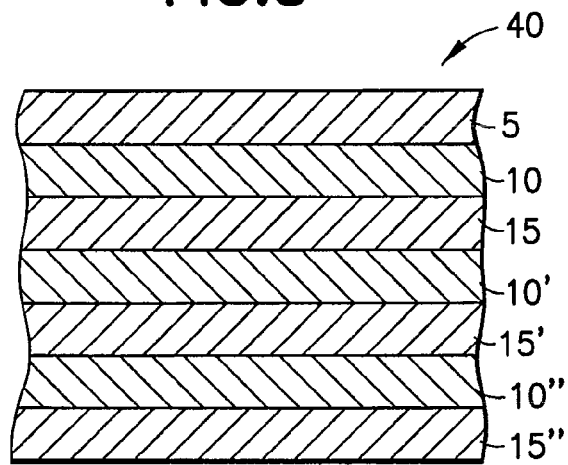
FIG. 4 is a partial cross-sectional view of a still further embodiment of the present invention showing a seven-layer bonded composite.

These further embodiments are depicted in FIGS. 3 and 4. FIG. 3 shows a five-ply bonded composite 20 which comprises three-layers 5, 15, and 15' of an aluminum alloy such as 3003 (or similar alloy) which are bonded to two sides of a core layer 10 and 10' of a higher purity aluminum of the 1XXX series, such as 1050, 1100, 1145, or the like. This five-ply composite 20 may also have a non-stick coating 2 applied to layer 5 and/or an anodized coating 4 applied to layer 15', if desired, as previously described, but not shown in FIG. 3.

A still further embodiment of the present invention is a seven-ply bonded composite 40 depicted in FIG. 4. The seven-ply composite further enhances the properties of the three-ply composite 1 and five-ply composite 20. The seven-ply bonded composite 40 comprises four aluminum alloy layers 5, 15, 15', and 15" such as 3003 aluminum alloy (or similar alloy) bonded on two sides to three respective core layers 10, 10', and 10" of higher purity aluminum, such as 1050, 1100, 1145, or the like. As in the previously described embodiments, the composite 40, after being formed into cookware, may receive a non-stick coating 2 on aluminum alloy layer 5 to form the cooking surface and an anodized coating 4 on aluminum alloy layer 15" on the outer exterior surface of the cookware to provide a pleasing, scratch-resistant surface, but not shown in FIG. 4.

The various embodiments described herein, namely, three-ply, five-ply, and seven-ply bonded composites, as well as others, such as nine-ply composite or more, may occur to those skilled in the art, without departing from the spirit of the invention, and provide cookware with enhanced cooking performance and strength while preserving the light weight of aluminum compared with conventional cookware containing heavier copper or stainless steel layers.

What is claimed is:

1. Cookware of a multi-layer bonded composite comprising first and second layers of an aluminum alloy directly bonded to opposed sides of a first core layer of a higher purity aluminum.

2. The cookware of claim 1, including a non-stick coating applied to a cook surface of a first of the two layers of aluminum alloy and an anodized coating applied to an exterior surface of at least a second of the two layers of aluminum alloy.

3. The cookware of claim 1, wherein exterior surfaces of the first and second aluminum alloy layers have an anodized layer applied thereto.

4. The cookware of claim 3, wherein the anodized layer on the first aluminum layer has a non-stick layer applied thereto, defining a cook surface of the cookware.

5. The cookware of claim 1, including a second core layer of higher purity aluminum directly bonded to the second of the aluminum alloy layers and including a third layer of aluminum alloy directly bonded to the second core layer of higher purity aluminum.

6. The cookware of claim 5, including a non-stick coating applied to a cook surface of the first of the layers of aluminum alloy and an anodized coating applied to an exterior surface of at least the third layer of aluminum alloy.

7. The cookware of claim 5, further including a third core layer of higher purity aluminum directly bonded to the third aluminum alloy layer and a fourth aluminum alloy layer directly bonded to the third core layer of higher purity aluminum.

8. The cookware of claim 7, including a non-stick coating applied to a cook surface of the first aluminum alloy layer and an anodized coating applied to an exterior surface of at least the fourth aluminum alloy layer.

9. The cookware of claim 1, defining a three-ply bonded composite product in the form of a stock pot, fry pan, sauté pan, griddle, or grill.

10. The cookware of claim 2, defining a three-ply bonded composite product in the form of a stock pot, fry pan, sauté pan, griddle, or grill.

11. The cookware of claim 5, defining a five-ply bonded composite product in the form of a stock pot, fry pan, sauté pan, griddle, or grill.

12. The cookware of claim 6, defining a five-ply composite cookware product in the form of a stock pot, fry pan, sauté pan, griddle, or grill.

13. The cookware of claim 7, defining a seven-ply composite cookware product in the form of a stock pot, fry pan, sauté pan, griddle, or grill.

14. The cookware of claim 8, defining a seven-ply composite cookware product in the form of a stock pot, fry pan, sauté pan, griddle, or grill.

15. The cookware of claim 1, wherein the first and second aluminum alloy layers are one of 3003, 3004 or like aluminum alloy and the core layer has an aluminum content of at least 99% by weight.

16. The cookware of claim 5, wherein the first and second aluminum alloy layers are one of 3003 or 3004 aluminum alloy and the core layer is one of 1050, 1100, or 1145 aluminum.

17. The cookware of claim 7, wherein the first and second aluminum alloy layers are one of 3003 or 3004 aluminum alloy and the core layer is one of 1050, 1100, or 1145 aluminum.

18. A method for manufacturing cookware comprising the steps of:
   providing a bonded composite comprising at least three layers of material including a core layer of a high purity aluminum, and two layers of an aluminum alloy wherein each layer of the aluminum alloy is bonded to the core layer of high purity aluminum; and
   forming the bonded composite into a cookware shape.

19. The method of claim 18 including the steps of:
   applying a non-stick coating to one of the aluminum alloy layers to define a cooking surface; and
   applying an anodized coating to the other of the aluminum alloy layers to define an outer surface of the cookware.

20. The cookware of claim 2 wherein the anodized coating is applied to both the first and second layers of aluminum alloy and the non-stick coating is applied to the anodized coating on the first layer of aluminum to define a cook surface of the cookware.

* * * * *

UNITED STATES PATENT AND TRADEMARK OFFICE
CERTIFICATE OF CORRECTION

| | | |
|---|---|---|
| PATENT NO. | : 9,060,639 B2 | Page 1 of 1 |
| APPLICATION NO. | : 13/479450 | |
| DATED | : June 23, 2015 | |
| INVENTOR(S) | : William A. Groll | |

It is certified that error appears in the above-identified patent and that said Letters Patent is hereby corrected as shown below:

In the claims

Column 5, Lines 3-4, Claim 16, delete "1145aluminum." and insert -- 1145 aluminum. --

Signed and Sealed this
Eighth Day of December, 2015

Michelle K. Lee
*Director of the United States Patent and Trademark Office*